(12) United States Patent
Niemann et al.

(10) Patent No.: US 8,899,109 B2
(45) Date of Patent: Dec. 2, 2014

(54) DEVICE FOR ASCERTAINING A FILL LEVEL OF A MEDIUM

(75) Inventors: Thomas Niemann, Delmenhorst (DE);
Jürgen Palloks, Westerstede (DE);
Thomas Kück, Weyhe (DE); David Hessenkämper, Bremen (DE); Ingo Zoyke, Stuhr (DE); Herbert Claassen, Bremen (DE)

(73) Assignee: HELLA KGaA Hueck & Co., Lippstadt (DE)

( * ) Notice: Subject to any disclaimer, the term of this patent is extended or adjusted under 35 U.S.C. 154(b) by 309 days.

(21) Appl. No.: 13/374,770

(22) Filed: Jan. 12, 2012

(65) Prior Publication Data

US 2012/0234091 A1    Sep. 20, 2012

(30) Foreign Application Priority Data

Jan. 14, 2011  (DE) .......................... 10 2011 088 585

(51) Int. Cl.
*G01F 23/296* (2006.01)

(52) U.S. Cl.
CPC .......... *G01F 23/2962* (2013.01); *G01F 23/296* (2013.01)
USPC ..................................................... 73/290 V

(58) Field of Classification Search
CPC . G01F 23/268; G01F 23/2925; G01F 23/296; G01F 23/0046; G01F 15/14; F01M 11/12; F01M 2011/0441
USPC .......... 73/290 V, 290 B, 290 R, 304 R, 304 C
See application file for complete search history.

(56) References Cited

U.S. PATENT DOCUMENTS

| | | | |
|---|---|---|---|
| 5,587,068 A * | 12/1996 | Aho et al. ........................ | 96/210 |
| 7,270,690 B1 | 9/2007 | Sindel | |
| 7,465,426 B2 * | 12/2008 | Kerherve et al. .............. | 422/68.1 |
| 2007/0193350 A1 | 8/2007 | Nishizu et al. | |
| 2008/0072755 A1 | 3/2008 | Dooley | |
| 2009/0301187 A1 * | 12/2009 | Beyer et al. ................. | 73/290 V |

FOREIGN PATENT DOCUMENTS

| | | |
|---|---|---|
| DE | 10 2006 002 975 | 8/2007 |
| DE | 10 2009 036 888 A1 | 12/2012 |
| EP | 2 366 984 A1 | 3/2010 |
| WO | WO 2008/009277 A1 | 7/2007 |
| WO | 10 2010 011 490 | 9/2011 |

OTHER PUBLICATIONS

EPO Search Report dated Jul. 4, 2012 for EP Application 11 19 5623.
English translation of German Search Report dated Oct. 5, 2011 for German Patent Application 102011 008 585.8.

* cited by examiner

*Primary Examiner* — David A Rogers
(74) *Attorney, Agent, or Firm* — Kenneth F. Pearce

(57) ABSTRACT

In the case of a device for ascertaining a fill level of a medium inside a collection container, having at least one measuring chamber, in which an ultrasonic sensor is arranged, connected to conduct media to the collection chamber, and having at least one antechamber connected upstream from the measuring chamber, which has at least one inlet opening for the medium from the collection chamber, at least one flow damper for the medium, according to the invention, is arranged in at least one subarea of the antechamber. Thereby multiple antechambers, which are connected in series one behind another to conduct media, are connected upstream from the measuring chamber.

29 Claims, 2 Drawing Sheets

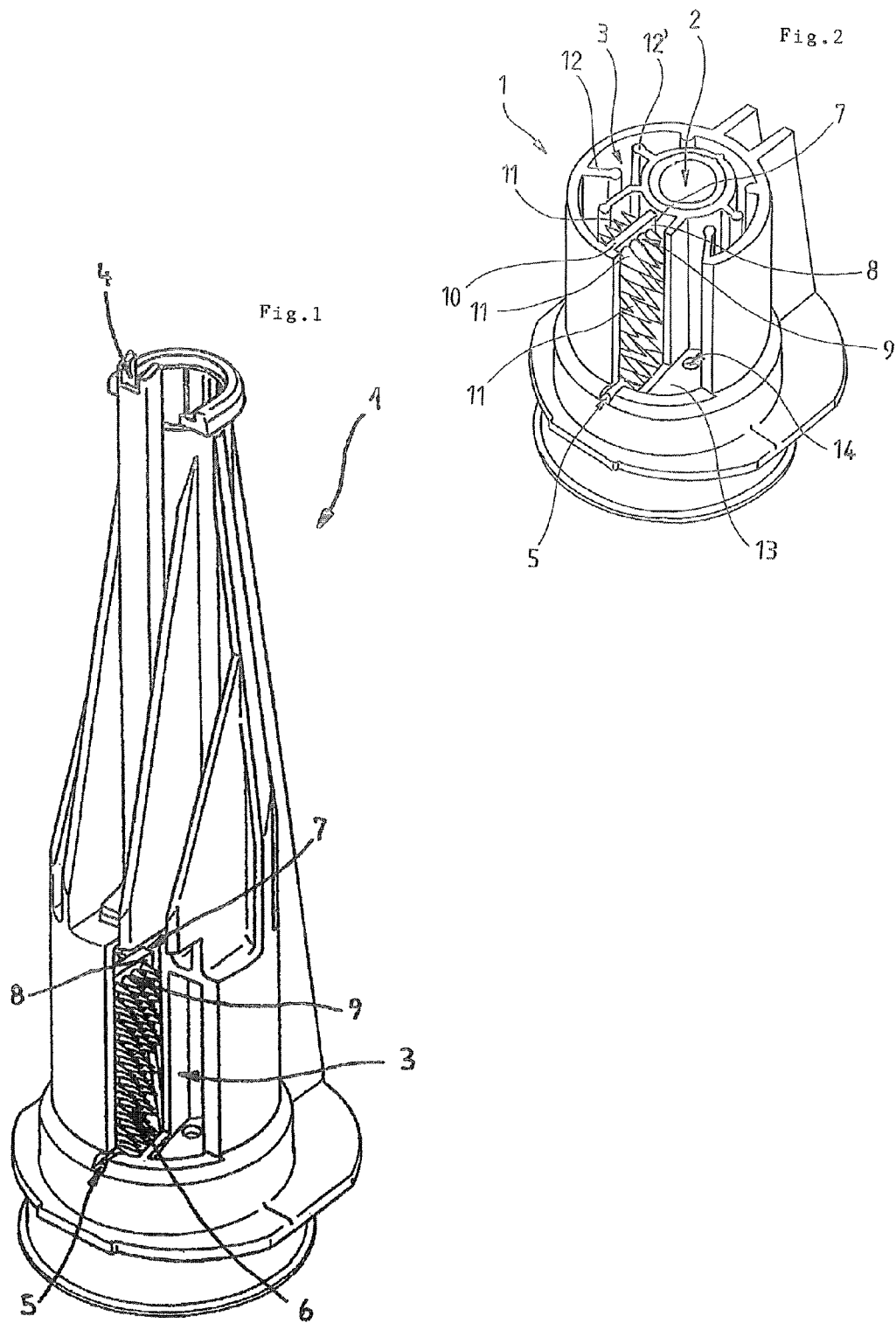

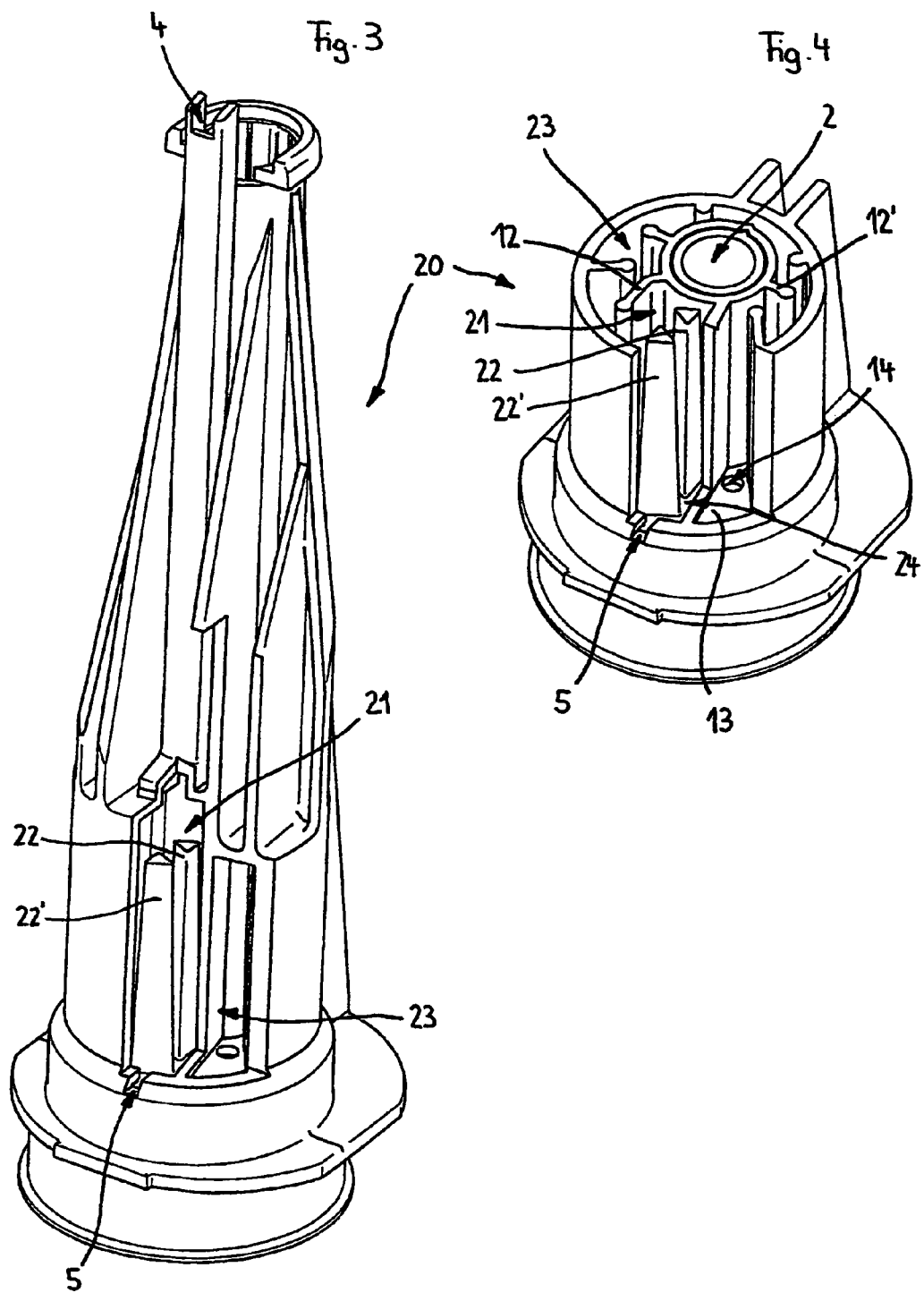

DEVICE FOR ASCERTAINING A FILL LEVEL OF A MEDIUM

Under 35 U.S.C §119, Applicants claim priority to the earlier filed German Patent Application, Serial No. 102011 008 585.8 filed on Jan. 14, 2011.

BACKGROUND OF THE INVENTION

The invention relates to a device for ascertaining a fill level of a medium, in particular inside a collection container, having at least one measuring chamber, in which an ultrasonic sensor is arranged, connected to conduct media to the collection container, and having at least one antechamber connected upstream from the measuring chamber, which has at least one inlet opening for the medium from the collection container.

BRIEF SUMMARY OF THE INVENTION

Devices of the above-mentioned species are used in particular in collection containers for liquid media, for example, in an oil catch container of an engine, in particular to be able to ascertain the fill level of the medium, such as oil or fuel, within the container. The devices typically have an ultrasonic sensor for this purpose, which is frequently arranged in a lower area of the collection container and has a measuring area oriented in the direction of the surface of the medium. The measuring signals emitted from the ultrasonic sensor are typically reflected on the surface of the liquid and the reflected signals are in turn picked up by the sensor. The fill level in the collection container may be determined from the ascertained runtime between output and pickup of the measuring signals, which are particularly provided as sound waves. Especially in the case of measurements of the fill level in the oil catch container of an engine, inaccuracies can occur during the measurement, since the continuous circulation of the medium typically results in foaming of the oil, gas bubbles forming in the medium. To calm the medium to be measured, the devices used have a separate measuring chamber, within which the ultrasonic sensor is arranged, connected to conduct media to the collection container. In order to calm the medium sufficiently before it enters the measuring chamber and simultaneously to achieve the separation of the gas bubbles from the medium, at least one antechamber is frequently connected upstream from the measuring chamber. The antechamber is equipped with an inlet opening for the medium from the collection container and has an outlet opening for a media-conducting connection to the measuring chamber. Furthermore, the antechamber is provided with a deaeration unit, which extends beyond the surface of the medium.

Inter alia, in such devices for ascertaining a fill level, specific physical effects can occur due to the superposition of physical state variables in combination with the design embodiment of the device, for example, the formation of two stationary flows in opposite directions, also known as a Schlichting flow. These flows arise in specific operating states of the engine, such as various speeds and the oscillations dependent thereon, which then results in the medium being pressed into or pulled out of the chambers of the device. The level of the medium in the measuring chamber accordingly rises or falls excessively, which results in a relatively imprecise fill level measurement.

The invention is therefore based on the object of improving a device of the above-described species in such a manner that a reliable measurement of the fill level within the measuring chamber is always ensured.

In a device for ascertaining a fill level of a medium inside a collection container, having at least one measuring chamber, in which an ultrasonic sensor is arranged, connected to the collection container to conduct media, and having at least one antechamber connected upstream from the measuring chamber, which has at least one inlet opening for the medium from the collection container, it is provided according to the invention that a flow damper for the medium is arranged in at least one subarea of the antechamber.

With the aid of a device implemented in this manner according to the invention, in whose antechamber at least one flow damper for the medium is provided, possible undesired flows or eddies of the medium are prevented or swirled by the flow damper in such a manner and thus minimized to an advantageously small size. Flows which still possibly sometimes temporarily occur therefore no longer have a disadvantageous influence on the level of the medium inside the measuring chamber. The performed fill level measurement is accordingly also no longer influenced. The flow damper is arranged in the measuring chamber in such a manner that it is located in the actual origin area of the flows. It can then optimally counteract the origin in particular of a main flow and a secondary flow oriented opposite thereto.

According to an advantageous refinement of the invention, it is provided that the measuring chamber has multiple antechambers connected upstream, which are connected to one another in series to conduct media. The use of multiple antechambers has the advantage that the medium is optimally calmed on an extended route to the measuring chamber and simultaneously gas bubbles located in the medium are advantageously completely separated. The antechambers connected upstream from the measuring chamber can advantageously be implemented on different levels. The antechamber connected directly to the collection chamber is preferably arranged above a further antechamber connected downstream, so that an automatic deaeration function is ensured. The entry of gas bubbles into the antechamber located underneath or even into the measuring chamber may thus be avoided in a particularly advantageous way.

In this context, it can be provided that a plurality of the antechambers are equipped with a flow damper. Therefore, the formation of disadvantageously acting flows can advantageously at least be counteracted by means of multiple flow dampers inside the device at multiple points simultaneously. In the best case, possible flows are even completely prevented from originating. The flow dampers are particularly implemented in antechamber areas, which have corners or angled edges.

Each flow damper is preferably assigned to the inlet area of a respective antechamber, since the probability of the origin of two flows, known as a Schlichting flow, is greatest in this area of the antechamber. The cause of such physical effects is often a deflection of the medium by means of a chamber wall occurring directly after the inlet opening in the inlet area of the antechamber, which in particular provides an extension of the flow route for the medium to the measuring chamber. For this purpose, the antechamber is implemented as meandering, for example, because of which the antechamber has relatively many turns, which cause a force-directed guiding of the medium in the antechamber. For example, a spiral-shaped structure can also be provided inside the antechamber instead of a meandering structure in the example of a circularly implemented antechamber.

According to a refinement of the invention, it is provided that at least one of the flow dampers is implemented as a material structure through which medium can flow. Such a possible implementation represents a possibility having simple design for the design of a flow damper, which may be inserted readily into a predetermined subarea of a respective antechamber, for example. A flow damper implemented in this manner can particularly be implemented in an arbitrarily large area of the antechamber, since its structure through which medium can flow additionally does not cause any noteworthy pressure loss. The formation of an oriented flow in the antechamber is predominantly advantageously prevented by the arbitrarily extending material structure. For example, steel wool can be used as the material structure through which medium can flow. Of course, the use of other material structures is also conceivable, for example, a lattice structure extending arbitrarily in the space.

At least one of the flow dampers is implemented as a contour part around which medium can flow, which is arranged inside the antechamber in particular in the origin area of the flows to be expected. Multiple such contour parts are preferably inserted into at least one of the antechambers behind the inlet area, which therefore effectively advantageously suppress the formation of the stationary flows oriented in opposite directions. A flow damper implemented as a contour part can be implemented as pyramidal and can extend over a predetermined height inside the antechamber. Other shapes are also possible, of course, for example, the design of the contour part having a polygonal cross-section, which maintains its dimensions in the extension direction or optionally changes its cross-section.

It is also in the scope of the invention that the flow damper is a planar element, which has at least one deflection surface having an overflow edge for the medium. The planar element, which is oriented perpendicular to the surface normal line in the antechamber, extends in particular over the entire width of a subsection and over a predetermined height of the antechamber. The medium flowing into a respective antechamber is therefore effectively deflected on the deflection or baffle surface. The planar element preferably has only a single overflow edge. In addition, the inlet area of the antechamber may advantageously be changed or adapted accordingly in its size using such a contour part, so that the origination of flows in the inlet area of an antechamber, which generate excess pressures or partial vacuums, is advantageously prevented.

The planar element has a plurality of damping bodies protruding thereon on at least one of its deflection surfaces, with the aid of which the origination of flows is additionally counteracted in the inlet area of the antechamber. With the aid of the damping bodies, in particular on both deflection surfaces of the planar element, the reliability of the device is further advantageously improved during the ascertainment of a fill level in a collection container. The origination of a Schlichting flow is counteracted best in that the damping bodies, which protrude into a possible flow, swirl the flow, so that it becomes diffuse. Therefore, no pressure buildup or pressure drop occurs at the inlet opening of the device or a respective antechamber, whereby an excessive increase or drop of the liquid level in the measuring chamber is always reliably prevented.

According to another advantageous refinement of the invention, it is provided that each damping body has a changing cross-section in the extension direction. The damping bodies, which are preferably implemented on both deflection surfaces, of the flow damper, which extends in particular over the entire width of a respective antechamber, divide a respective inflow area of an antechamber into a plurality of subareas in the best case. The origination of flows oriented in opposite directions in these areas is therefore nearly precluded. The damping bodies protrude perpendicularly on the deflection surfaces of the flow damper implemented as a planar element and extent in particular from the deflection surface nearly up to an adjacent wall area of a respective antechamber. Each individual damping body can have an arbitrary geometrical basic shape, for example, circular or polygonal. In the extension direction, the cross-sections of the damping bodies can taper in a subsection and also widen again in another subsection.

Furthermore, the invention relates to an engine, in particular an internal combustion engine for a motor vehicle, for which independent protection is claimed, the engine being distinguished in that it comprises a device according to one of claims 1 to 9. In particular the fill level of the engine oil may always be reliably ascertained on an engine which can be equipped with such a device according to the invention for ascertaining the fill level of a medium. Damage because of a possible undetected minimum level of the engine oil can thus advantageously be prevented.

In addition, protection is claimed for a vehicle, in particular a motor vehicle, which has an engine which is equipped with a device according to the invention for detecting a fill level.

BRIEF DESCRIPTION OF THE DRAWINGS

Possible exemplary embodiments of the invention, from which further features according to the invention result, are shown in the drawing. In the figures:

FIG. 1: shows a perspective view of a first embodiment of a device according to the invention in partial section;

FIG. 2: shows a perspective view of the device according to FIG. 1 in section;

FIG. 3: shows a perspective view of a second exemplary embodiment of a device according to the invention; and FIG. 4: shows a sectional view of the device according to FIG. 3.

DESCRIPTION OF THE PREFERRED EMBODIMENTS

A device for ascertaining a fill level of a medium in a container (not shown) is identified by 1, which has at least one measuring chamber 2 (FIG. 2), in which the level of the medium is ascertained with the aid of an ultrasonic sensor (not shown). At least one first antechamber 3, in which in particular the medium flowing from the container into the antechamber 3 is to calm down and possible gas bubbles located in the liquid medium are to be separated, is connected upstream from the measuring chamber 2. For this purpose, the device has at least one deaeration unit 4. Furthermore, a flow damper 7 is provided immediately behind the inlet opening 5 of the first antechamber 3 in its inlet area 6. Possible flows oriented in opposite directions, which form arbitrarily immediately behind the inlet opening in specific operating states of an engine, are to be prevented from originating with the aid of the flow damper 7.

As FIG. 2 illustrates, the flow damper 7 is implemented in particular as a planar element 8 having at least one deflection surface 9 and has at least one overflow edge 10. The planar element 8, which extends in particular over the entire width of the channel-type antechamber 3, has a plurality of spherical damping bodies 11 on its deflection surfaces 9. The damping bodies 11 each protrude perpendicularly to the deflection surfaces 9 and extend nearly up to an adjacent wall area of the antechamber 3. Furthermore, FIG. 2 shows that the antechamber is implemented like a channel, the antechamber 3 enveloping at least a subsection of the measuring chamber 2. In addition, the antechamber 3 has webs 12, 12' protruding approximately transversely into the channel, which cause a deflection and thus an extension of the flow route for the medium. A passage opening 14 is provided on the floor 13 of the antechamber 3, which produces a connection to a further antechamber, which is implemented below the first antechamber 3.

FIGS. 3 and 4 show a further exemplary embodiment of a device 20 according to the invention, which fundamentally has a similar design as the above-described device 1. Instead of a planar element, two contour parts 22, 22', around which medium can flow, are provided in the antechamber 23 as the flow damper 21. The contour parts are in turn arranged directly behind the inlet opening 5 in the inlet area 24 of the antechamber 23, the contour parts 22, 22' having a triangular footprint in this embodiment. Furthermore, each contour part extends upward perpendicularly to the surface normal line. The cross-sections of the contour parts taper uniformly up to the upper end. Identical components are identified by identical reference numerals.

What is claimed is:

1. A motor vehicle comprising an engine and a device associated with said engine for ascertaining a fill level of a medium inside a collection container; said device comprising:
   a) a measuring chamber, including an ultrasonic sensor; said measuring chamber capable of conducting said medium to said collection container;
   b) a first antechamber positioned upstream from said measuring chamber comprising one or more webs;
   c) a deaerator in fluid communication with said first antechamber;
   d) an inlet for supplying said medium from said collection container to said first antechamber; and
   e) a first flow damper capable of interfering with Schlichting flow; said first flow damper positioned in said first antechamber and proximate said inlet.

2. The device of claim 1 further comprising one or more additional antechambers connected in series with said first antechamber and positioned upstream from said measuring chamber.

3. The device of claim 2, wherein an additional flow damper is provided within said one or more additional antechambers.

4. The device of claim 3, wherein at least one of said first or additional flow dampers allows medium to flow therethrough.

5. The device of claim 4, wherein said at least one of said first or additional flow dampers comprise: a generally planar deflection surface and an overflow edge.

6. The device of claim 5, wherein at least one generally planar deflection surface comprises a plurality of damping bodies extending away from said generally planar surface.

7. The device of claim 6, wherein said damping bodies are either polygonal or spherical.

8. The device of claim 7, wherein the cross-section of one or more of said polygonal damping bodies is changed as said one or more of said polygonal damping bodies extends away from said planar deflection surface.

9. A device capable of interfering with Schlichting flow and of ascertaining a fill level of a medium inside a collection container associated an internal combustion engine; said device comprising:
   a) a measuring chamber, including a sensor; said measuring chamber capable of conducting medium to said collection container;
   b) an antechamber upstream from said measuring chamber; said antechamber comprising one or more webs;
   c) a deaerator in communication with said antechamber;
   d) an inlet for supplying medium from said collection container to said antechamber; and
   e) a flow damper positioned in said antechamber.

10. The device of claim 9 further comprising more than one said antechambers connected in series and upstream from said measuring chamber.

11. The device of claim 10, wherein more than one of said series of said antechambers comprises a flow damper, and wherein at least one of said flow dampers is positioned proximate said inlet.

12. The device of claim 11, wherein said sensor is an ultrasonic sensor.

13. The device of claim 12, wherein at least one of said flow dampers allows medium to flow therethrough.

14. The device of claim 13, wherein at least one of said flow dampers is contoured for allowing medium to flow around said flow damper.

15. The device of claim 14, wherein said at least one of said flow dampers comprises:
   a) a planar deflection surface; and
   b) an overflow edge.

16. The device of claim 15, wherein at least one generally planar deflection surface comprises a plurality of damping bodies extending away from said generally planar surface.

17. The device of claim 16, wherein said damping bodies are either pyramidal or polygonal.

18. The device of claim 17, wherein one or more of said polygonal damping bodies cross sections is changed as said one or more of said polygonal damping bodies extends away from said planar deflection surface.

19. A device for ascertaining a fill level of a medium inside a collection container associated with an engine; said device comprising:
   a) a measuring chamber, including a sensor; said measuring chamber capable of conducting medium to said collection container;
   b) an antechamber upstream from said measuring chamber; said antechamber comprising at least one web;
   c) an inlet for supplying medium from said collection container to said antechamber; and
   d) a flow damper positioned in said antechamber.

20. The device of claim 19 further comprising more than one said antechambers connected in series and upstream from said measuring chamber.

21. The device of claim 20 further comprising a deaerator in communication with one of said antechambers.

22. The device of claim 21, wherein more than one of said series of said antechambers comprises a flow damper, and wherein at least one of said flow dampers is positioned proximate said inlet.

23. The device of claim 22, wherein said sensor is an ultrasonic sensor.

24. The device of claim 23, wherein at least one of said flow dampers allows medium to flow therethrough.

25. The device of claim 24, wherein at least one of said flow dampers is contoured for allowing medium to flow around said flow damper.

26. The device of claim 25, wherein said at least one of said flow dampers comprises:
   a) a planar deflection surface; and
   b) an overflow edge.

27. The device of claim 26, wherein at least one generally planar deflection surface.

28. The device of claim 27, wherein said damping bodies are either pyramidal or polygonal.

29. The device of claim 28, wherein one or more of said polygonal damping bodies cross sections is changed as said one or more of said polygonal damping bodies extends away from said planar deflection surface.

* * * * *